(12) United States Patent
Yeh

(10) Patent No.: US 7,398,385 B2
(45) Date of Patent: Jul. 8, 2008

(54) COMPUTER-AIDED SETUP METHOD FOR SETTING UP A SYSTEM CONFIGURATION OF AN OPTICAL DISK PLAYER

(75) Inventor: Jakie Yeh, Taipei (TW)

(73) Assignee: Via Technologies, Inc., Taipei (TW)

( * ) Notice: Subject to any disclaimer, the term of this patent is extended or adjusted under 35 U.S.C. 154(b) by 445 days.

(21) Appl. No.: 10/956,075

(22) Filed: Oct. 4, 2004

(65) Prior Publication Data
US 2005/0076345 A1 Apr. 7, 2005

(30) Foreign Application Priority Data
Oct. 3, 2003 (TW) .............................. 92127476 A

(51) Int. Cl.
*G06F 9/06* (2006.01)
(52) U.S. Cl. .......................... 713/100; 713/1; 717/168
(58) Field of Classification Search ................. 713/100, 713/1; 711/162; 717/168
See application file for complete search history.

(56) References Cited

U.S. PATENT DOCUMENTS 5,497,490 A * 3/1996 Harada et al. ............... 713/100
6,931,523 B1 * 8/2005 Tomoson et al. ............ 713/100
7,134,009 B2 * 11/2006 Jonsson ......................... 713/1
2003/0061604 A1 * 3/2003 Elcock et al. ................ 717/170
2003/0204578 A1 * 10/2003 Yip et al. .................... 709/222

OTHER PUBLICATIONS

Lanovation, Prism Pack—Software Packaging: Fast, Reliable, Smart—Nov. 2001—User's Guide, Version 4, pp. 19-49.*

* cited by examiner

*Primary Examiner*—Thuan N Du
(74) *Attorney, Agent, or Firm*—Birch, Stewart, Kolasch & Birch, LLP

(57) ABSTRACT

A computer-aided setup method of system configuration, comprising the following steps: starting system configuration setup software; setting up all parameters of system configuration then saving as a system configuration file and storing into an optical disk or a removable storage device; loading the system configuration file saved in an optical disk or a removable storage device into an optical disk player and transferring the system configuration file into system setting; and applying the system setting when displaying.

11 Claims, 3 Drawing Sheets

COMPUTER-AIDED SETUP METHOD FOR SETTING UP A SYSTEM CONFIGURATION OF AN OPTICAL DISK PLAYER

BACKGROUND OF THE INVENTION

1. Field of the Invention

The present invention generally is related to a method of setup system configuration, and more particularly referred to a computer-aided setup method of system configuration for an optical disk player.

2. Description of the Related Art

A common used optical disk player has the function of setting up system configuration, thus user could set up their own best display environment base on related hardware such as speaker numbers.

Because the hardware limit of a common used optical disk player, setting up system configuration is complex for user, particularly to a beginner. For example, few buttons on the panel of the optical disk player and on the remote control result in difficult setup. When user wants to set up system configuration, first, they must press a menu button on the panel or on the remote control to call for system main menu which comprises numbers of system selections; second, moving the cursor to one system selection which user wants to set up by direction buttons and getting into the system selection menu which comprises numbers of configuration selections needed to be set up; moving the cursor to one configuration selection which user wants to set up; after setting up, back to the system selection menu and get into another system selection to set up other configuration selections; users must repeat those boring steps until finishing setting up system configuration.

Furthermore, a configuration selection could comprise numbers of parameters needed to be set up and listed in a configuration selection menu, for example, when user wants to set up video and audio parameters, first, they call for system main menu and chose the "video/audio" labeled system selection and get into the "video/audio" labeled system selection menu which comprises at least two configuration selections "video" and "audio" labeled respectively; the "video" labeled configuration selection further comprises numbers of parameters such as color, brightness, contrast and all listed in the corresponding configuration selection menu; also, the "audio" labeled configuration selection further comprises numbers of parameters such as channel number, language and all listed in the corresponding configuration selection menu.

The flow chart of system configuration setup method for a common used optical disk player is shown in FIG. 1:

110 calling for system main menu which comprises numbers of system selections;

120 moving the cursor to one system selection and getting into the corresponding system selection menu which comprises numbers of configuration selections;

130 moving the cursor to one configuration selections and getting into the corresponding configuration selection menu which comprises numbers of parameters;

140 setting up parameters within the configuration selection menu;

150 breaking out of the configuration selection menu and backing to the system selection menu;

160 if any other configuration selection needed to be set up yes, go to step 130;

else 170 breaking out of the system selection menu and backing to the system main menu;

180 if any other system selection needed to be set up;

yes, go to step 120;

else 190 breaking out of the system main menu and system setup is finished.

As the description above, it is noticed that system configuration setup of a common used optical disk is not friendly, and due to the limit of memory space, the optical disk player could not provide enough information for user especially to those who don't have related knowledge, as a result, user might waste a lot of time to set up. Additionally, the optical disk player has numbers of parameters, at the most time, user don't know the parameter meanings and don't know how to get the best display performance.

SUMMARY OF THE INVENTION

The present invention provides a computer-aided setup method of system configuration for an optical disk player, thus user could setup system configuration easily and could get all information and suggestions when setting the parameters, even more, the present invention also provides a teaching function which could teach step by step when user don't know how to set up.

In the preferred embodiment of the present invention, a computer-aided setup method of system configuration comprises the following steps: starting system configuration setup software; setting up all parameters of system configuration then saving as a system configuration file and storing into an optical disk or a removable storage device; loading the system configuration file saved in an optical disk or a removable storage device into an optical disk player and transferring the system configuration file into system setting; and applying the system setting when displaying.

In the preferred embodiment of the present invention, a optical disk player with computer-aided system configuration setup comprises a servo controller, reading out disk data to control motor; a MPEG (moving picture experts group) decoder, processing video and audio signals; a memory slot, linking an external removable storage device, such as a flash-type memory, a memory card, a portable hard disk and so on; a CPU (central processor unit), executing programs; and an EPROM (erasable programmable read-only memory), storing system setting.

The system configuration which is set up and saved in an optical disk or a removable storage device could be loaded into EPROM by reading the optical disk or inserting the removable storage device into the memory slot, then transferring the system configuration file into system setting and applying the system setting when displaying.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Due to a few button of a common used optical disk player, user set up system configuration in complex way; and due to less memory space, user don't get enough information.

The present invention provides a computer-aided setup method of system configuration, by the suggestions of system configuration setup software on PC (personal computer), thus user could easily finish setting up system configuration and then getting the best display performance, even more, the system configuration software further provides a step by step teaching function.

A preferred embodiment is given as following to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore the present invention is not intended to be limited to the particular embodiments shown and described herein, but is to be accorded the widest scope herein disclosed.

Figure 1:
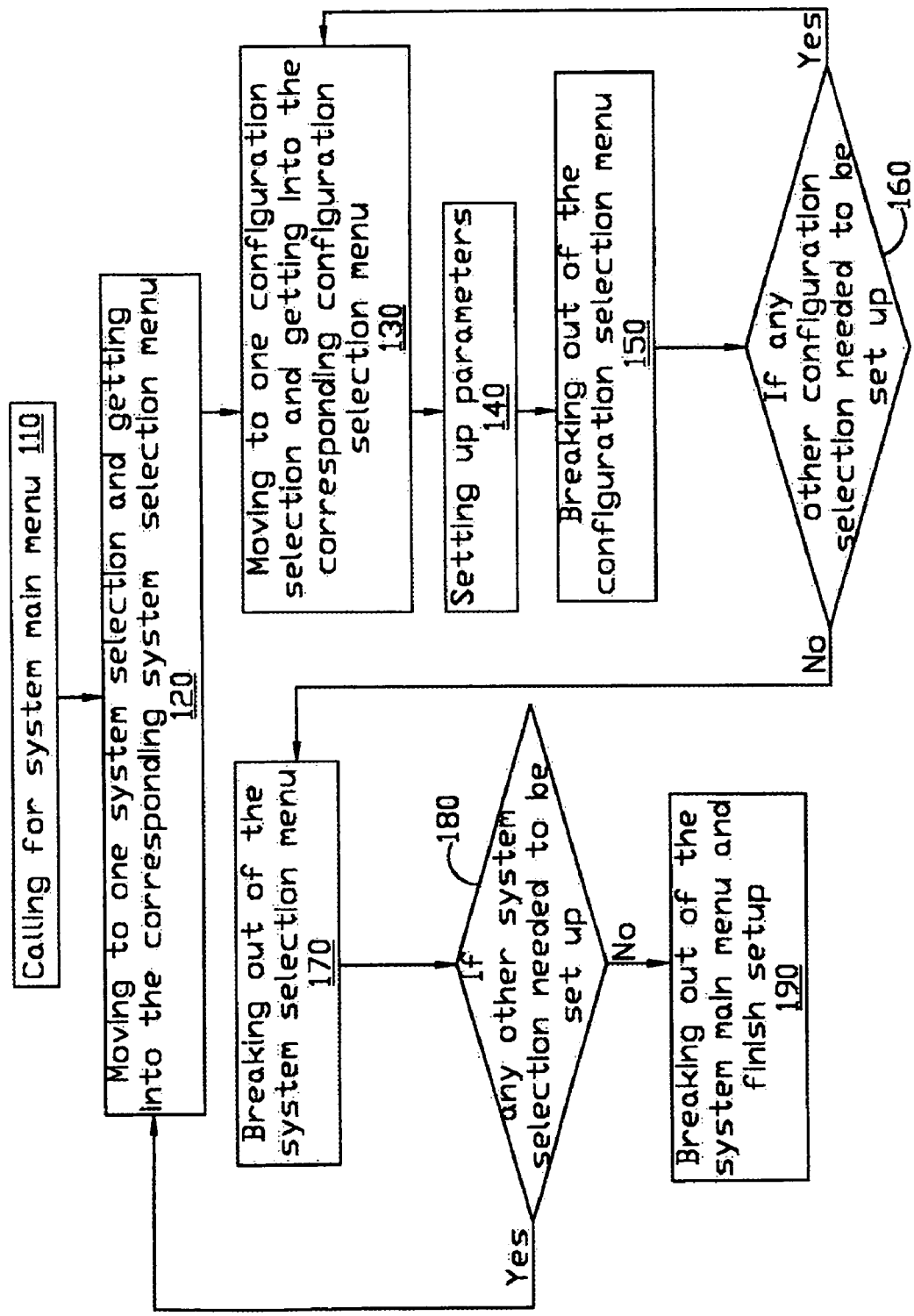
FIG. 1 shows the flow chart of system configuration setup method for a common used optical disk player.
Figure 2:
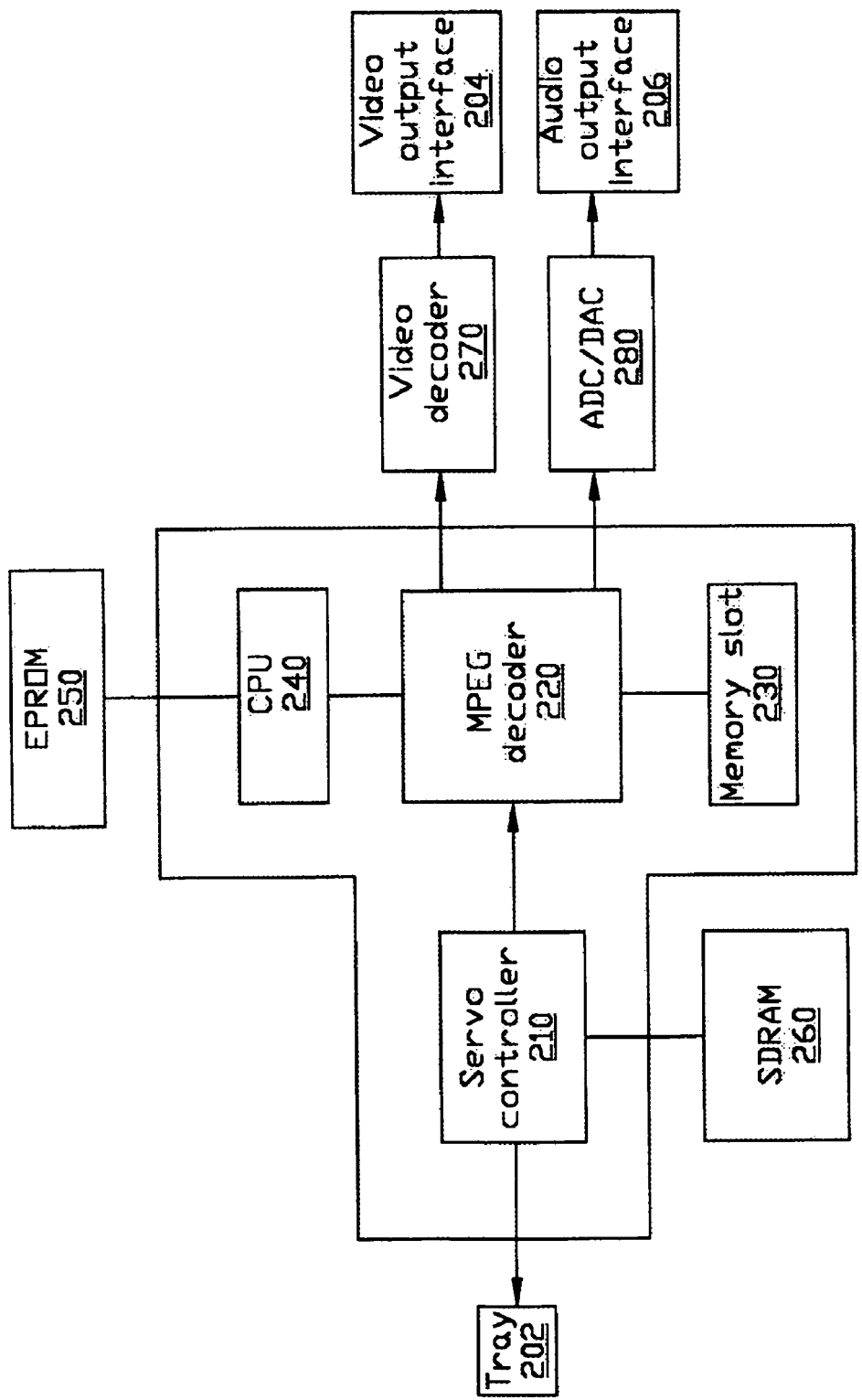
FIG. 2 shows the architecture block diagram of an optical disk player with computer-aided system configuration setup of the present invention.

FIG. 2 shows the architecture block diagram of an optical disk player 200 with computer-aided system configuration setup of the present invention, comprising a tray 202, used for placing an optical disk; a servo controller 210, coupled to tray 202, controlling a motor to read out disk data; a MPEG decoder, coupled to servo controller 210, processing video and audio signals; a memory slot 230, coupled to MPEG decoder 220, linking an external removable storage device such as a memory card, a flash-type memory, a portable hard disk and so on, and the interface of memory slot 230 could be a USB (universal serial bus) interface; a CPU 240, coupled to MPEG decoder 220, executing programs; an EPROM 250, coupled to CPU 240, storing system setting; a SDRAM (synchronous dynamic random access memory) 260, coupled to servo controller 210, storing disk data; a video encoder 270, coupled to MPEG decoder 220, transferring the video signals into NTSC (National Television System Committee) or PAL (Phase Alternation Line) form outputted by video output interface 204; and a ADC (analog-to-digital converter)/DAC (digital-to-analog converter) 280, coupled to MPEG decoder 220, processing audio signals outputted by audio output interface 206.

The present invention provides a computer-aided system configuration setup software which supports all kinds of PC operation system (OS).

In the present invention, a computer-aided setup method of system configuration is firstly starting the system configuration setup software on PC, and setting up all kinds of parameters (such as speaker numbers and so on). According to the suggestion functions provided by the system configuration setup software, user can easily know the meaning of each parameter and how to set up parameters to get optimal display performance. Furthermore, the system configuration setup software provides the teaching functions which can guide beginner to set up parameters. Next, saving the set up system configuration as a system configuration file and storing into an optical disk or a removable storage device such as a memory card. If the system configuration file is stored in an optical disk, putting the optical disk saved system configuration file into tray 202 of the optical disk player 200 and the system configuration file is transferred into system setting by CPU 240, then loaded into EPROM 250 of the optical disk player 200 and default system setting is rewritten; finally, applying the system setting when displaying. If the system configuration file is stored in a removable storage device, for example, a memory card, inserting the memory card saved system configuration file into memory slot 230 of the optical disk player 200 and the system configuration file is transferred into system setting by CPU 240, then loaded into EPROM 250 of the optical disk player 200 and rewriting default system setting; finally, applying the system setting when displaying; or alternatively, the system configuration file is transferred into system setting by CPU 240, the system setting can be written back into the memory card and the system can directly apply the system setting from the memory card without loading into EPROM 250.

Figure 3:
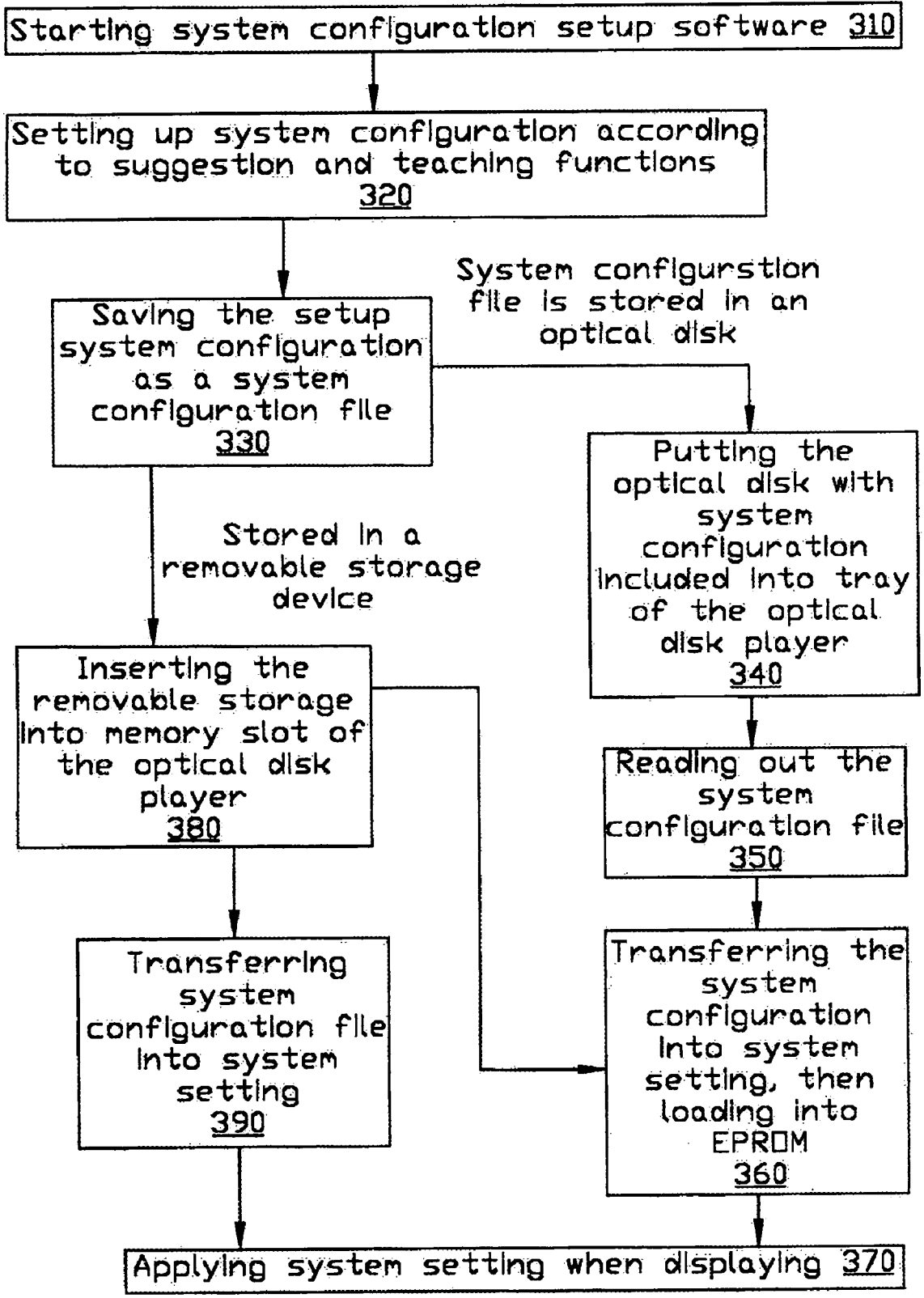
FIG. 3 shows the flow chart of computer-aided setup method for system configuration of the present invention.

FIG. 3 shows the flow chart of computer-aided setup method for system configuration of the present invention.

310 starting system configuration setup software on PC;

320 setting up system configuration according to suggestions and teaching functions provided by system configuration setup software;

330 saving the setup system configuration as a system configuration file;

if the system configuration file is stored in an optical disk, then 340 putting the optical disk saved system configuration file into tray 202 of the optical disk player 200;

350 reading out the system configuration file;

360 CPU 240 transfers the system configuration file into system setting, then loading into EPROM 250 and rewriting default system setting;

370 applying system setting when displaying;

if the system configuration file is stored in a removable storage device such as a memory card and so on, then 380 inserting the removable storage device into memory slot 230 of the optical disk player 200, then go to step 360 and step 370; or 390 CPU 240 transfers system configuration file into system setting, and the system setting can be written back into the memory card, then go to step 370.

Comparing with a common used optical disk player, the present invention provides a computer-aided setup method of system configuration, by the suggestion and teaching functions, user could set up the most suitable system configuration easily, and get the best display performance. Additionally, user could set up several groups of different system configuration flies and uses different system settings in different display conditions.

Finally, those skilled in the art should appreciate that they can readily use the disclosed conception and specific embodiment as a basis for designing or modify other structures for carrying put the same purpose of the present invention without departing from the spirit and scope of the invention as defined by the appended claims.

What is claimed is:

1. A computer-aided method for setting up a system configuration of an electronic device, comprising:

starting a system configuration setup software on a personal computer;

saving a system configuration file into a removable storage device after finishing set up system parameters;

inserting said removable storage device into said electronic device through a specific interface;

transferring said system configuration file into a system setting by a central processing unit of said electronic device; and applying said system setting to said electronic device;

wherein said system configuration setup software has suggestions and teaching functions; and wherein said electronic device is an optical disk player embedded with said specific interface for accessing said removable storage device.

2. The method of claim 1, wherein the suggestions and teaching functions provided by said system configuration setup software comprises:

prompting system parameters which are setup and parameter meanings; and prompting users to choose parameters to get the best display performance.

3. The method of claim 1, wherein said specific interface is a USB (universal serial bus) interface.

4. The method of claim 1, wherein said removable storage device is a flash-type memory, a memory card or portable hard disk.

5. The method of claim 1, wherein groups of system configuration files with different settings are allowable, and user could use different system settings in different display conditions.

6. The method of claim 1, further comprising saving said system setting into a non-volatile memory of said electronic device to rewrite a default system setting.

7. The method of claim 1, further comprising writing said system setting back in to said removable storage device such that said system setting can be directly applied from said removable storage device.

8. A computer-aided method for setting up system configuration of an optical disk player, comprising:

setting up system configuration on a personal computer, saving as a system configuration file and storing into a storage device;

placing said storage device into said optical disk player and loading said system configuration file;

transferring said system configuration file into system setting by a central processing unit of said optical disk player; and applying system setting to said optical disk player.

9. The method of claim 8, wherein further comprising saving said system setting into a non-volatile memory of said optical disk player to rewrite a default system setting stored in said non-volatile memory.

10. The method of claim 8, wherein said storage device is an optical disk.

11. The method of claim 8, groups of system configuration files with different settings are allowable, and user could use different system setting in different display conditions.

* * * * *